US011710272B2

United States Patent
Coffey et al.

(10) Patent No.: US 11,710,272 B2
(45) Date of Patent: Jul. 25, 2023

(54) VOLUMETRIC REPRESENTATION OF DIGITAL OBJECTS FROM DEPTH RENDERINGS

(71) Applicant: Disney Enterprises, Inc., Burbank, CA (US)

(72) Inventors: Dane M. Coffey, Burbank, CA (US); Siroberto Scerbo, Montrose, CA (US); Daniel L. Baker, Los Angeles, CA (US); Mark R. Mine, Canyon Country, CA (US); Evan M. Goldberg, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/211,724

(22) Filed: Mar. 24, 2021

(65) Prior Publication Data

US 2022/0309737 A1 Sep. 29, 2022

(51) Int. Cl.
*G06T 15/08* (2011.01)
*G06T 15/20* (2011.01)
(Continued)

(52) U.S. Cl.
CPC ............. *G06T 15/08* (2013.01); *G06T 7/593* (2017.01); *G06T 15/20* (2013.01); *G06T 17/10* (2013.01); *G06T 17/20* (2013.01); *H04N 5/2224* (2013.01)

(58) Field of Classification Search
CPC ......... G06T 15/08; G06T 15/20; G06T 7/593; G06T 17/10; G06T 17/20; H04N 5/2224
See application file for complete search history.

(56) References Cited

U.S. PATENT DOCUMENTS

| 2012/0194644 A1* | 8/2012 | Newcombe ............... G06T 7/74 |
| | | 348/46 |
| 2016/0012633 A1* | 1/2016 | Wei ........................ G06T 7/593 |
| | | 345/420 |

(Continued)

FOREIGN PATENT DOCUMENTS

EP 3 599 587 A2 1/2020

OTHER PUBLICATIONS

"A Volumetric Method for Building Complex Models from Range Images" by Brian Curless and Marc Levoy. (Stanford University, 1996).

(Continued)

*Primary Examiner* — Tize Ma
(74) *Attorney, Agent, or Firm* — Farjami & Farjami LLP

(57) ABSTRACT

An image processing system includes a computing platform having processing hardware, a display, and a system memory storing a software code. The processing hardware executes the software code to receive a digital object, surround the digital object with virtual cameras oriented toward the digital object, render, using each one of the virtual cameras, a depth map identifying a distance of that one of the virtual cameras from the digital object, and generate, using the depth map, a volumetric perspective of the digital object from a perspective of that one of the virtual cameras, resulting in multiple volumetric perspectives of the digital object. The processing hardware further executes the software code to merge the multiple volumetric perspectives of the digital object to form a volumetric representation of the digital object, and to convert the volumetric representation of the digital object to a renderable form.

18 Claims, 9 Drawing Sheets

(51) Int. Cl.
    *G06T 17/20*    (2006.01)
    *G06T 17/10*    (2006.01)
    *G06T 7/593*    (2017.01)
    *H04N 5/222*    (2006.01)

(56) References Cited

U.S. PATENT DOCUMENTS

| | | | |
|---|---|---|---|
| 2017/0091996 A1* | 3/2017 | Wei | G06T 7/33 |
| 2017/0148155 A1* | 5/2017 | Wei | H04N 9/04 |
| 2017/0356755 A1* | 12/2017 | Strawn | G01C 21/3676 |
| 2020/0054398 A1* | 2/2020 | Kovtun | G16H 40/63 |
| 2020/0134911 A1* | 4/2020 | van Hoff | G06T 7/292 |
| 2021/0044788 A1* | 2/2021 | Mecca | H04N 13/254 |
| 2021/0279950 A1* | 9/2021 | Phalak | G06V 20/64 |

OTHER PUBLICATIONS

"High-Quality Streamable Free-Viewpoint Video" by Collet et al. (ACM, 2015).

"How it works—Mixed Reality Capture Studios." *Microsoft Mixed Reality Capture Studios*, Siggraph 2015. https://docs.microsoft.com/en-us/windows/mixed-reality/develop/platform-capabilities-and-apis/how-it-works-mixed-reality-capture-studios.

"Live 3D Holograms. Real people, virtually anywhere." *Imverse*, 2019. http://www.imverse.com.

Extended European Search Report for European Application 22158969.9 dated Aug. 5, 2022.

\* cited by examiner

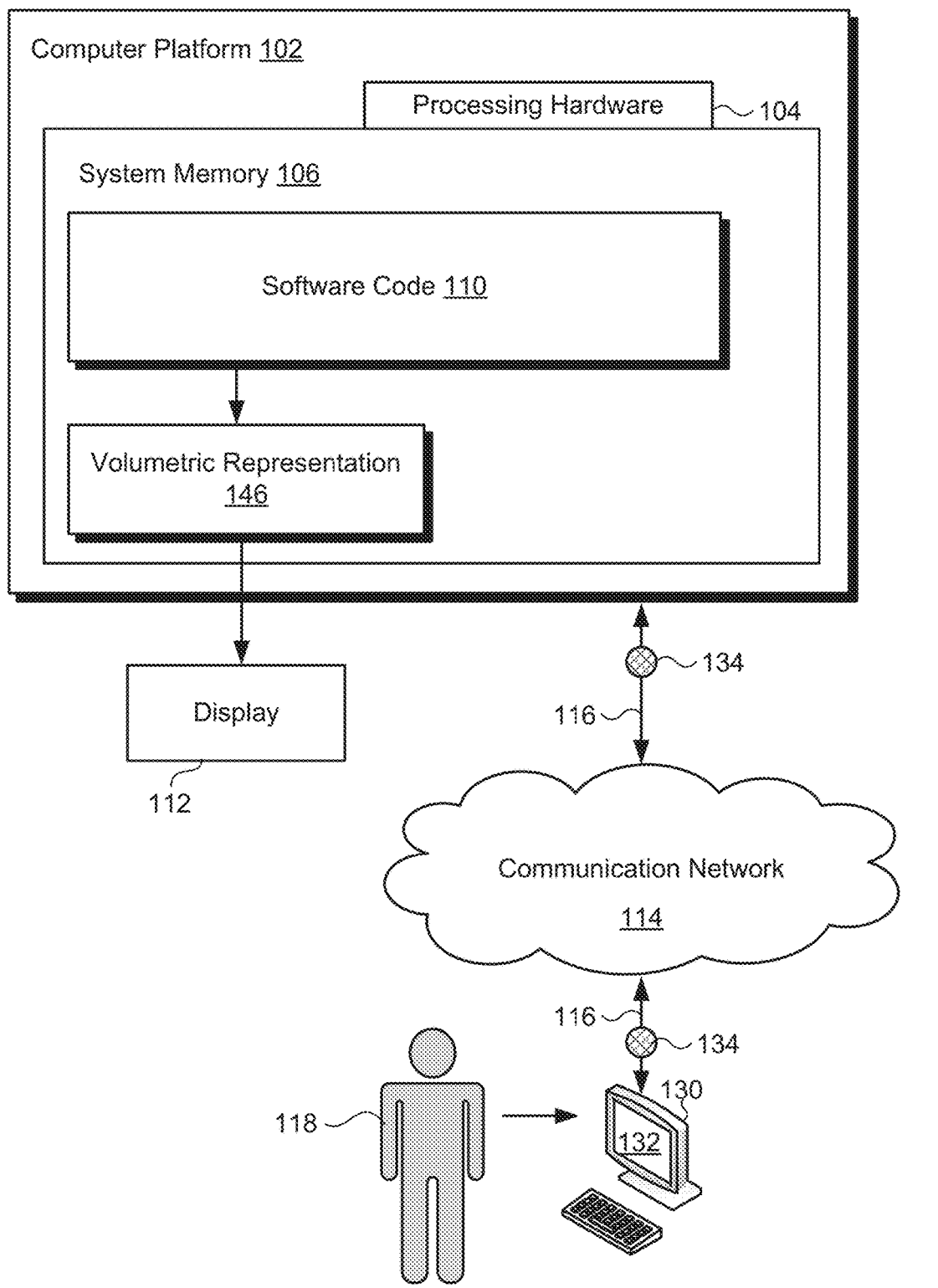

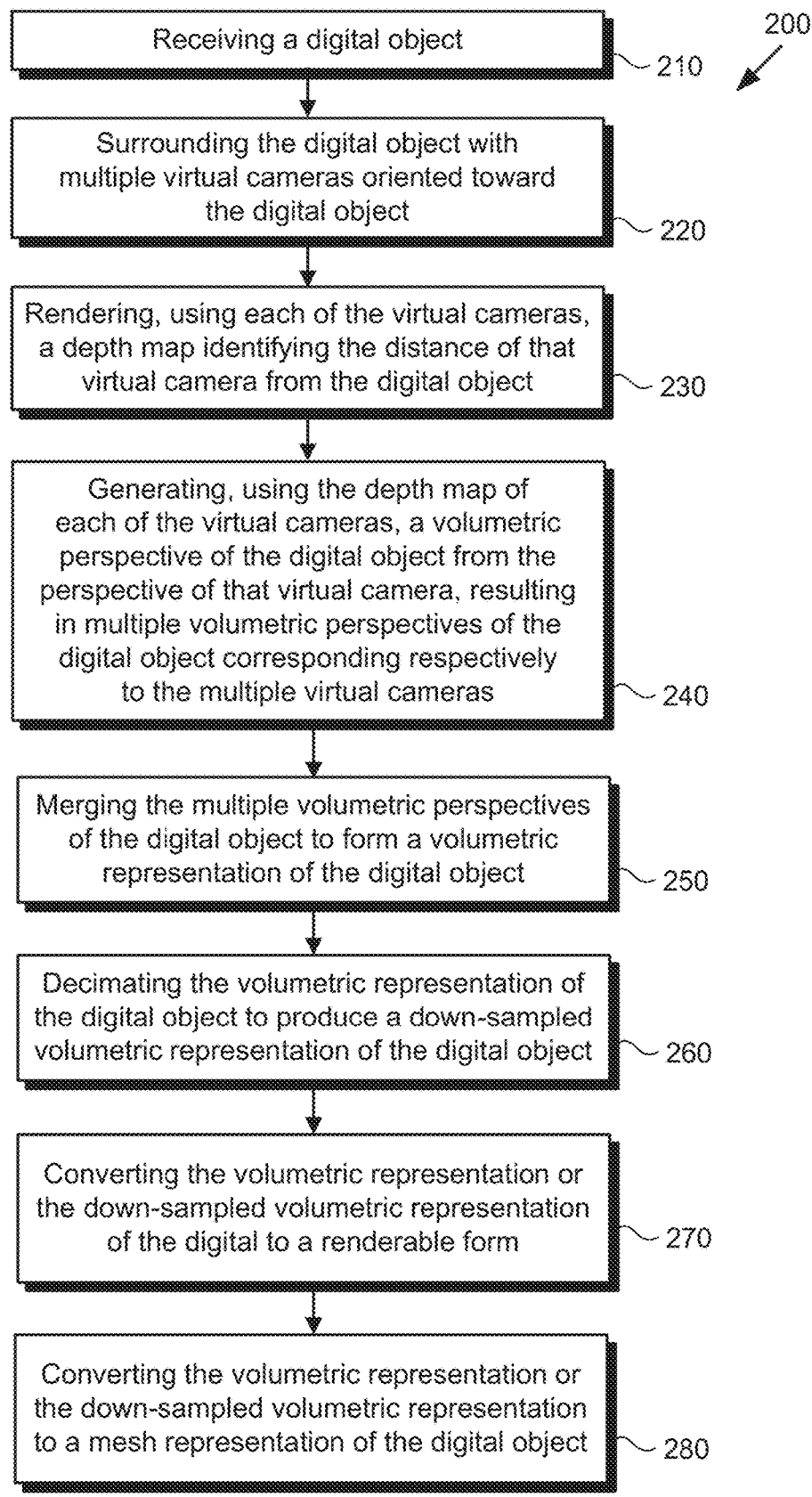

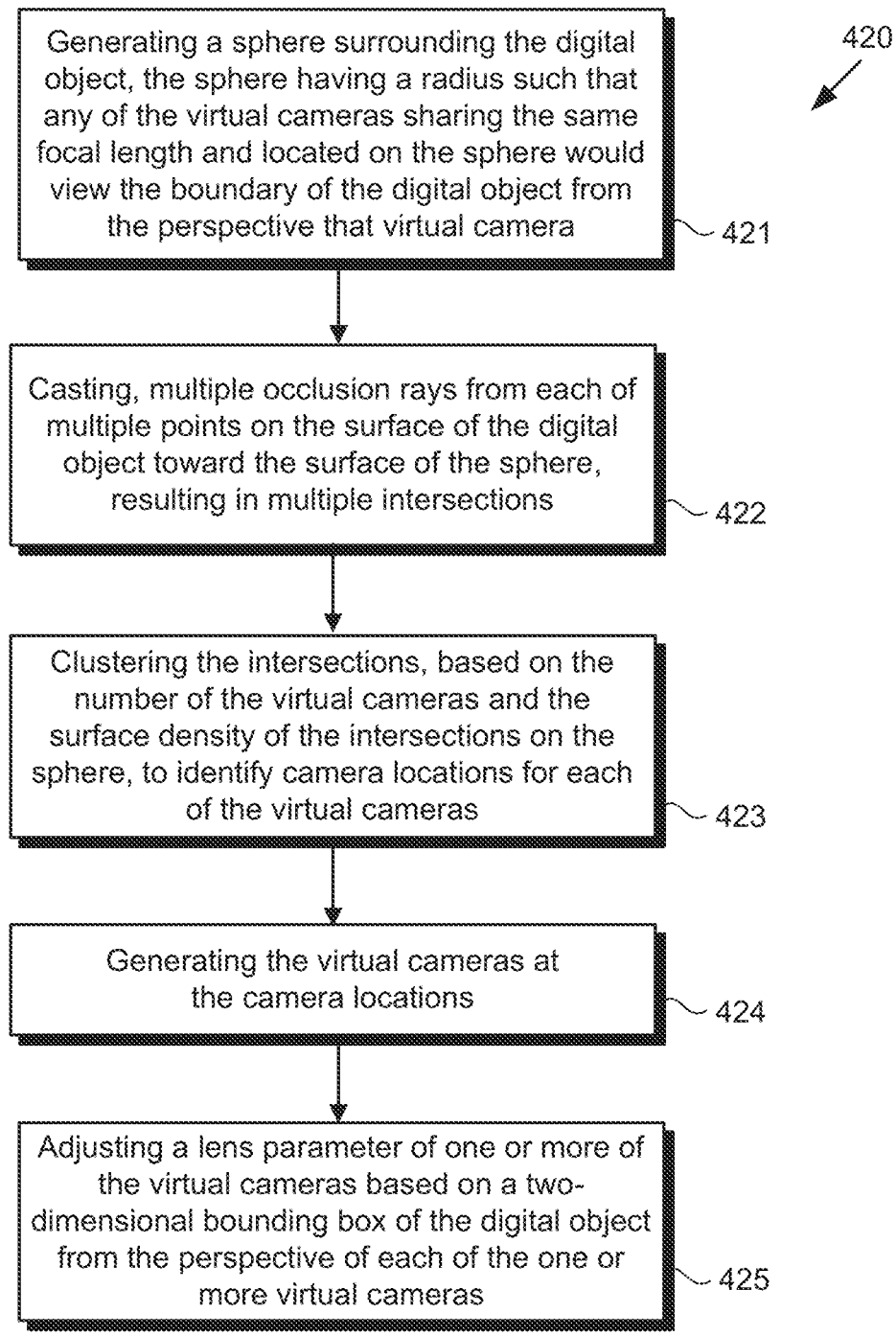

VOLUMETRIC REPRESENTATION OF DIGITAL OBJECTS FROM DEPTH RENDERINGS

BACKGROUND

The types of three-dimensional digital objects used in content production pipelines can be incredibly complex. For example, digital models of characters and other artistic assets are typically in the form of meshes having many parts and including upwards of millions of polygons. The complexity of digital assets, while not free of challenges for pre-rendered content, are typically manageable due to the advantage of lengthy offline renders on large compute farms. However, real-time rendering of such high complexity digital assets on mobile devices or in game engines is impracticable. As a result, those high complexity digital assets must be significantly simplified for their use on mobile platforms or in game engines to be possible.

In the conventional art, simplification of a film quality digital asset often includes remodeling the asset by one or more artists to reduce its complexity. Due to its intense reliance on human participation, this manual remodeling is both undesirably costly and time consuming. Consequently, there is a need in the art for a substantially automated solution for converting high complexity film quality digital objects to digital objects that are simple enough to be rendered on mobile devices and in game engines. While there exist techniques to perform automatic decimation on models, most implementations act on source geometry that lack important render-time details (e.g. application of displacement maps, procedurals, etc.).

BRIEF DESCRIPTION OF THE DRAWINGS

FIG. 1 shows an exemplary image processing system for performing volumetric representation of digital objects from depth renders, according to one implementation;

FIG. 2 shows a flowchart presenting an exemplary method for performing volumetric representation of digital objects from depth renders, according to one implementation;

FIG. 4 shows a flowchart presenting a more detailed outline of a process for surrounding a digital object with virtual cameras, according to one implementation;

DETAILED DESCRIPTION

Figure 3A:
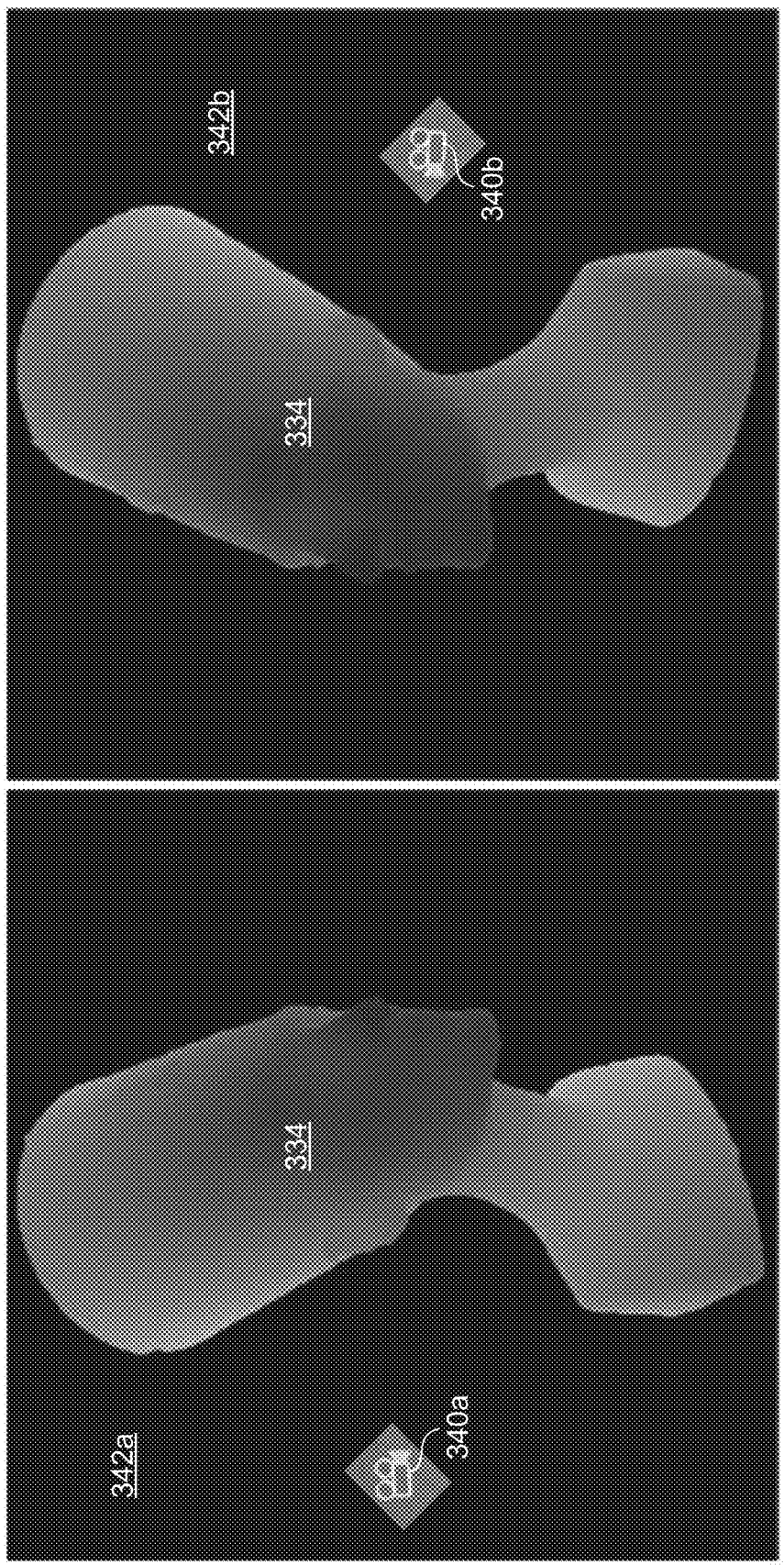
FIG. 3A depicts an intermediate action in the flowchart shown in FIG. 2, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing volumetric representation of digital objects from depth renders that overcome the drawbacks and deficiencies in the conventional art. Although techniques for automating the reduction of model complexity exist, conventional approaches typically act on source geometry that lacks important render-time details, such as the application of displacement maps and procedural geometries, for example. The solution disclosed in the present application uses an image-based depth reconstruction approach to generate a digital representation of a high complexity digital object that can advantageously be used in real-time applications such as in game engines while retaining those important render-time details. The present solution relies on flat two-dimensional (2D) renders of the original digital object only, and does not require the three-dimensional (3D) mesh information of the original digital object. A reduced complexity volumetric representation of the high complexity original digital object is reconstructed from 2D images, in a substantially automated process.

It is noted that, as used in the present application, the terms "automation," "automated," and "automating" refer to systems and processes that do not require human intervention. Although, in some implementations, a human artist may review or even modify a volumetric representation of a digital object produced by the systems described herein, that human involvement is optional. Thus, in some implementations, the methods for performing volumetric representation of digital objects from depth renders described in the present application may be performed under the control of hardware processing components executing them.

It is further noted that, as used in the present application, the expression "digital object" refers to any digital element, while the expression "digital asset" refers to a distinct part of a digital object. Furthermore, the expression "digital model" refers to a geometric mesh representation of a digital object or digital asset. It is also noted that, as used herein, the expression "high complexity," when used to describe a digital object, digital asset, or digital model, refers to a digital object, digital asset, or digital model of such extensive detail that it cannot be rendered fast enough for use in real-time applications.

FIG. 1 shows a diagram of one exemplary implementation of an image processing system for performing volumetric representation of digital objects from depth renders. As shown in FIG. 1, image processing system 100 includes computing platform 102 having processing hardware 104, display 112, and system memory 106 implemented as a computer-readable non-transitory storage medium. As further shown in FIG. 1, image processing system 100 may exist in a use environment including communication network 114, workstation terminal 130 including display 132, and artist or user 118 (hereinafter "user 118") utilizing workstation terminal 130. Also shown in FIG. 1 are digital object 134, software code 110, and volumetric representation 146 of digital object 134 produced by software code 110, as well as network communication links 116 interactively connecting workstation terminal 130 and image processing system 100 via communication network 114.

It is further noted that although software code 110 and volumetric representation 146 of digital object 134 are depicted as being stored in system memory 106, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, although FIG. 1 depicts software code 110 and volumetric representation 146 of digital object 134 as being stored in system memory 106 and as being located together in system memory 106, that representation is also merely provided as an aid to conceptual clarity. More generally, image processing system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that in some implementations, software code 110 and volumetric representation 146 of digital object 134 may be stored remotely from one another within the distributed memory resources of system 100. It is also noted that although FIG. 1 depicts volumetric representation 146 of digital object 134 as residing in system memory 106, in some implementations, volumetric representation 146 of digital object 134 may be copied to non-volatile storage.

Processing hardware 104 may include multiple hardware processing units, such as one or more central processing units, one or more graphics processing units, and one or more tensor processing units. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Moreover, in some implementations, communication network 114 may be a high-speed network suitable for high performance computing (HPC), for example a 10 GigE network or an Infiniband network.

Although workstation terminal 130 is shown as a desktop computer in FIG. 1, that representation is provided merely as an example as well. More generally, workstation terminal 130 may be any suitable mobile or stationary computing device or system that includes display 132 and implements data processing capabilities sufficient to implement the functionality ascribed to workstation terminal 130 herein. For example, in other implementations, workstation terminal 130 may take the form of a laptop computer, tablet computer, or smartphone, for example. Moreover, in some implementations, workstation terminal 130 may be a dumb terminal existing as a peripheral feature of image processing system 100. In those latter implementations, display 132 of workstation terminal 130 may be controlled by processing hardware 104 and software code 110 of computing platform 102.

With respect to display 112 of image processing system 100 and display 132 of workstation terminal 130, displays 112 and 132 may be implemented as liquid crystal displays (LCDs), light-emitting diode (LED) displays, organic light-emitting diode (OLED) displays, quantum dot (QD) displays, or any other suitable display screens that perform a physical transformation of signals to light. Furthermore, display 132 may be physically integrated with workstation terminal 130 or may be communicatively coupled to but physically separate from workstation terminal 130. For example, where workstation terminal 130 is implemented as a smartphone, laptop computer, or tablet computer, display 132 will typically be integrated with workstation terminal 130. By contrast, where workstation terminal 130 is implemented as a desktop computer, display 132 may take the form of a monitor separate from workstation terminal 130 in the form of a computer tower.

Figure 3B:
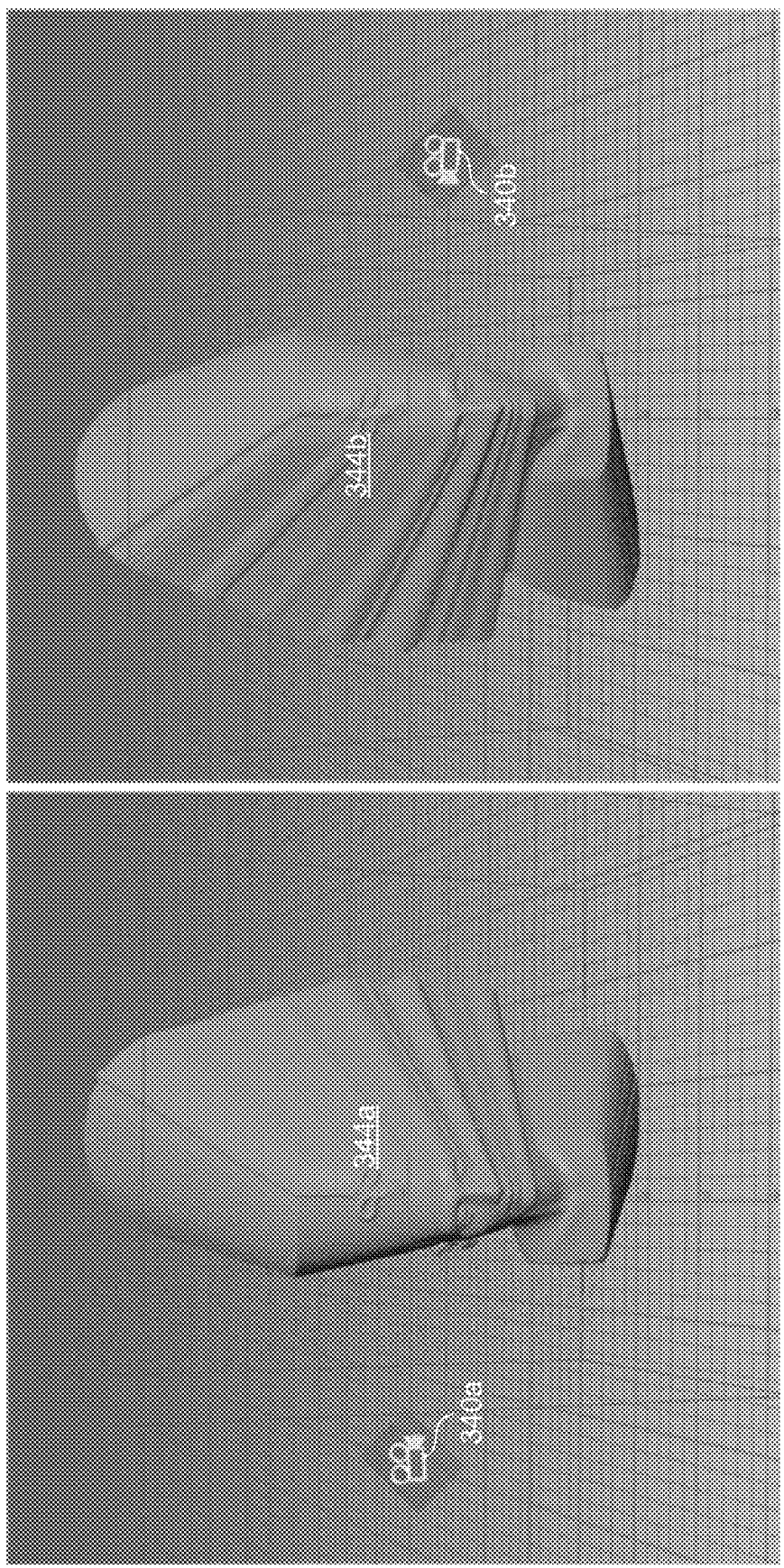
FIG. 3B depicts another intermediate action in the flowchart shown in FIG. 2, according to one implementation.
Figure 3C:
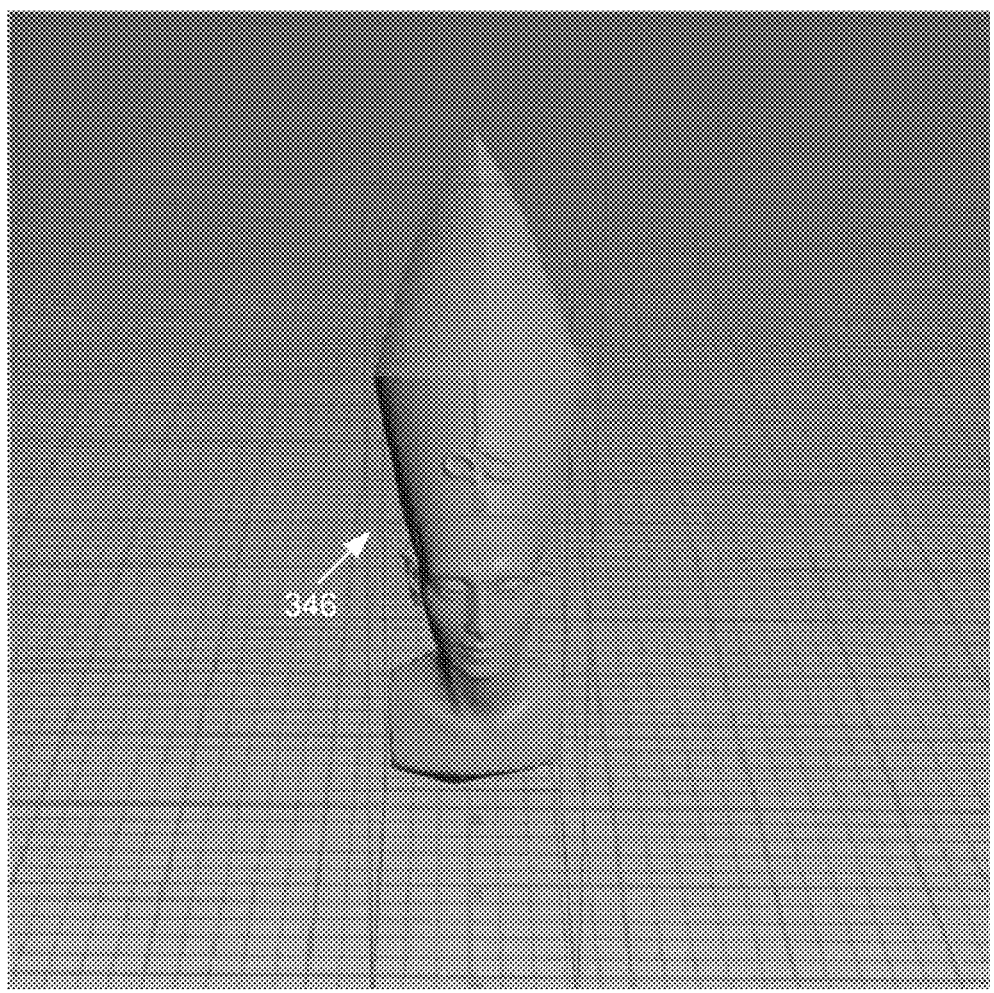
FIG. 3C depicts yet another intermediate action in the flowchart shown in FIG. 2, according to one implementation.

The functionality of software code 110 will be further described by reference to FIG. 2 in combination with FIGS. 1, 3A, 3B, and 3C. FIG. 2 shows flowchart 200 presenting an exemplary method for performing volumetric representation of digital objects from depth renders, according to one implementation, while FIGS. 3A, 3B, and 3C depict exemplary intermediate actions included in flowchart 200. With respect to the method outlined in FIG. 2, it is noted that certain details and features have been left out of flowchart 200 in order not to obscure the discussion of the inventive features in the present application.

Referring now to FIG. 2 in combination with FIG. 1, flowchart 200 begins with receiving digital object 134 (action 210). Digital object 134 may be a high complexity 3D model of a human being, character, animal, or inanimate object. As shown in FIG. 3A, for example, in some use cases digital object 334 may take the form of a 3D sculpted bust. It is noted that digital object 334 corresponds in general to digital object 134, in FIG. 1, and those corresponding features may share any of the characteristics attributed to either feature by the present disclosure. Digital object 134/334 may be represented by a triangle mesh, or other polygonal mesh, having a polygon count in the millions, or tens of millions. As a specific example, in one implementation, digital object 134/334 may be a visual effects (VFX) digital object created for use in a feature film.

Digital object 134/334 may be received in action 210 by software code 110, executed by processing hardware 104 of computing platform 102. As shown in FIG. 1, in some implementations, digital object 134/334 may be sent from user 118 via workstation terminal 130, communication network 114, and network communication links 116. In other implementations, digital object 134/334 may be stored in system memory 106 and may be received in action 210 as a data transfer within system memory 106.

Flowchart 200 further includes surrounding digital object 134/334 with multiple virtual cameras 340a and 340b oriented toward digital object 134/334 (action 220). It is noted that the process of surrounding digital object 134/334 with virtual cameras, including optimizing the locations and lens parameters of those virtual cameras is described in greater detail below by reference to flowchart 420, in FIG. 4, and FIGS. 5A, 5B, and 5C. For the present, it is sufficient to understand that digital object 134/334 is surrounded by a sufficient number of virtual cameras having locations such that each external feature of digital object 134/334 can be captured by at least one of the virtual cameras, i.e., the entire external surface of digital object 134/334 may be viewed or mapped by the multiple virtual cameras surrounding digital object 134/334. Thus, although FIG. 3A shows two virtual cameras 340a and 340b, more generally virtual cameras 340a and 340b may correspond to tens or hundreds of virtual cameras each located so as to have a unique perspective of digital object 134/334. Moreover virtual cameras 340a and 340b may be implemented using a variety of different camera configurations and lens parameters. For example in one implementation, virtual cameras 340a and 340b may take the form of panoramic cameras. Action 220 may be performed by software code 110, executed by processing hardware 104 of computing platform 102.

Flowchart 200 further includes rendering, using each of virtual cameras 340a and 340b, a depth map identifying the distance of each of virtual cameras 340a and 340b from digital object 134/334 (action 230). FIG. 3A shows depth map 342a of digital object 134/334 from the perspective of virtual camera 340a, as well as depth map 342b of digital object 134/334 from the perspective of virtual camera 340b. It is noted that although action 230 includes rendering digital object 134/334 from each of virtual cameras 340a and 340b, instead of red-green-blue (RGB) color information of the lighting of digital object 134/334, respective depth maps 342a and 342b are rendered so as to record the distance from each of virtual camera 340a and 340b to digital object 134/334.

It is further noted that the field of view of the perspective of each of virtual cameras 340a and 340b includes multiple pixels of digital object 134/334. In some implementations, depth map 342a identifies the distance of virtual camera 340a from each of the pixels of digital object 134/334 included in the field of view of virtual camera 340a, while depth map 342b identifies the distance of virtual camera 340b from each of the pixels of digital object 134/334 included in the field of view of virtual camera 340b.

For more accurate reconstructions of digital object 134/334, renders that support "deep rendering" can be used. Deep rendering stores multiple samples per pixel depending on the depth of the samples. Deep rendering may be particularly advantageous at the edges of digital object 134/334, where large depth discontinuities can exist, so that more accurate depth information can be obtained. That is to say, in some implementations, action 230 may include performing deep rendering for at least some of the pixels in the respective fields of view of virtual cameras 340a and 340b, such that depth maps 342a and 342b identify multiple depth values corresponding to the distance of respective virtual cameras 340a and 340b from each of the at least some of those pixels. Action 230 may be performed by software code 110, executed by processing hardware 104 of computing platform 102.

Flowchart 200 further includes generating, using depth map 342a and 342b, volumetric perspectives of digital object 134/334 from the perspective of each of virtual cameras 340a and 340b, resulting in a number of volumetric perspectives of digital object 134/334 that matches the number of virtual cameras 340a and 340b surrounding digital object 134/334 (action 240). Referring to FIG. 3B, FIG. 3B shows volumetric perspectives 344a and 344b from the respective perspectives of virtual cameras 340a and 340b. That is to say, for each of virtual cameras 340a and 340b, using their known positions and the depth render information contained in depth maps 342a and 342b, volumetric perspectives 344a and 344b of digital object 134/334 can be generated. Generation of volumetric perspectives 344a and 344b may be performed by software code 110, executed by processing hardware 104 of computing platform 102.

Flowchart 200 further includes merging volumetric perspectives 344a and 344b of digital object 134/334 to form a volumetric representation of digital object 134/334 (action 250). Referring to FIG. 3C, FIG. 3C shows volumetric representation 346 of digital object 134/334. Volumetric representation 346 corresponds in general to volumetric representation 146, in FIG. 1, and those corresponding features may share any of the characteristics attributed to either corresponding feature by the present disclosure.

In some implementations, for example, each of the volumetric perspectives generated from the perspectives of the virtual cameras surrounding digital object 134/334 can be combined together using a Boolean intersection operation. Moreover, using a signed distance function (SDF) representation for the volumetric perspectives makes such a Boolean operation very efficient and reliable. It also ensures that volumetric representation 146/346 is a watertight result by combining all of the volumetric perspectives. Thus, action 250 may include determining an SDF representation of each volumetric perspective of digital object 134/334, and combining those volumetric perspectives using a Boolean intersection operation to form volumetric representation 146/346 of digital object 134/334. Action 250 may be performed by software code 110, executed by processing hardware 104 of computing platform 102.

It is noted that by using an appropriate voxel size, volumetric representation 146/346 can be a very accurate reconstruction of the original model of digital object 134/334. It is further noted that the appropriateness of the voxel size used may be determined by the pixel resolution of the source renders. The film plane resolution of the renders informs the ideal voxel size. It is also noted that volumetric representation 146/346 of digital object 134/334 includes only the externally visible details of digital object 134/334 and omits data describing its interior features. As a result, volumetric representation 146/346 is a significantly simplified reproduction of digital object 134/334 having far less complexity than the original model of digital object 134/334.

In some use cases, it may be advantageous or desirable to further simplify volumetric representation 146/346 relative to the original model of digital object 134/334 by varying the voxel size used to produce volumetric representation 146/346 in different regions of volumetric representation 146/346, rather than using a uniform voxel size. For example, facial features may be improved by using a smaller voxel size, whereas regions corresponding to more uniform external features may be represented using larger voxel sizes without compromising the overall quality of the representation. In other words, in some use cases volumetric representation 146/346 of digital object 134/334 may include a first region having a first voxel size and a second region having a second voxel size different than the first voxel size.

In implementation in which it is advantageous or desirable to still further simplify volumetric representation 146/346 relative to the original model of digital object 134/334, flowchart 200 may further include decimating volumetric representation 146/346 of digital object 134/334 to produce a down-sampled volumetric representation of digital object 134/334 (action 260). It is noted that, as defined for the purposes of the present application, the terms "decimate," "decimation," and "decimating" have their usual and customary meaning in the art of signal processing. That is to say decimation is the process of down-sampling or compressing a data object. Thus action 260 results in the down-sampled volumetric representation of digital object 134/334 being data sparse relative to the original high complexity model of digital object 134/334.

Decimation of volumetric representation 146/346 may be performed by software code 110, executed by processing hardware 104 of computing platform 102. Some regions of volumetric representation 146/346 may be more sensitive to the effects of decimation than others. For example, facial features may be better preserved when the regions of volumetric representation are lightly decimated, whereas regions corresponding to more uniform external features may be more aggressively decimated without compromising the overall quality of the representation. In other words, in some use cases volumetric representation 146/346 of digital object 134/334 may include a first region and a second region, where the first region is less (or more) decimated than the second region.

Thus, the reduced complexity of volumetric representation 146/346 or the down-sampled volumetric representation of digital object 134/334 can be achieved using one or both of two approaches. In one approach, different voxel sizes can be used in different regions of volumetric representation 146/346. In a second approach, as described by action 260, a selective decimation of volumetric representation may be performed. The present novel and inventive concepts include use of either or both approaches.

In some implementations, flowchart 200 may conclude with converting volumetric representation 146/346 of digital object 134/334 formed in action 250, or the down-sampled volumetric representation of digital object 134/334 produced in action 260 to a renderable form (action 270). In addition, in some implementations action 270 may include rendering volumetric representation 146/346 or the down-sampled volumetric representation of digital object 134/334 on display 112, or on display 132 of workstation terminal 130. It is noted that the depth maps rendered in action 230 advantageously incorporate important render-time details, and enable the application of displacement maps and procedural geometries at render-time. Action 270 may be performed by software code 110, executed by processing hardware 104 of computing platform 102. For example, as noted above, in some implementations, workstation terminal 130 may be a dumb terminal existing as a peripheral feature of image processing system 100. In those latter implementations, display 132 of workstation terminal 130 may be controlled by software code 110 and processing hardware 104.

It is noted that, in some implementations, action 270 may follow directly from action 250, while action 260 may be omitted. However, in other implementations, action 270 may follow action 260, which may follow action 250. In still other implementations, action 270 may follow action 250 and may precede action 260.

In some implementations, flowchart 200 may continue and conclude with converting volumetric representation 146/346 of digital object 134/334 formed in action 250, or the down-sampled volumetric representation of digital object 134/334 produced in action 260 to a mesh representation of digital object 134/334 (action 280). In some such implementations, action 280 may include converting volumetric representation 146/346 or the down-sampled volumetric representation of digital object 134/334 to a mesh representation of digital object 134/334 having a reduced mesh element count relative to the original high complexity model of digital object 134/334.

It is noted that, as defined in the present application, the feature "mesh element count" refers to the number of individual surface components included in a surface conforming mesh representation. Thus, by way of example, the mesh element count of a triangle mesh is its triangle count, while the mesh element count of a more generalized polygon mesh is its polygon count. For example as noted above, digital object 134/334 may be represented by a mesh having a mesh element count in the millions, or tens of millions. By contrast, after conversion to a mesh representation, volumetric representation 146/346 of digital object 134/334, or the down-sampled volumetric representation of digital object 134/334 may have a mesh element count that is at least an order of magnitude less, i.e., a factor of ten less, than the mesh element count of the mesh representative of digital object 134/334.

Action 280 may be performed by software code 110, executed by processing hardware 104 of computing platform 102. It is noted that, in some implementations, action 280 may follow directly from action 250, while actions 260 and 270 may be omitted. In other implementations, action 280 may precede and be followed by action 260, and action 270 may be omitted. However, in other implementations, action 260 may be omitted and action 280 may precede action 270, which may follow action 250. In still other implementations, action 280 may follow directly from action 250 or 260.

Referring to FIG. 4, as noted above, FIG. 4 shows flowchart 420 presenting a more detailed outline of action 220 in flowchart 200, according to one implementation. It is noted that the number of virtual cameras 340a and 340b oriented toward digital object 134/334 may in some implementations be constrained to be a predetermined number of virtual cameras, and action 220 may be performed in order to substantially optimize camera positioning and orientation subject to that constraint. It is further noted that action 220, which may include actions 421, 422, 423, 424, and 425 (hereinafter "actions 421-425") outlined by flowchart 420, may be performed by software code 110, executed by processing hardware 104 of computing platform 102.

Figure 5A:
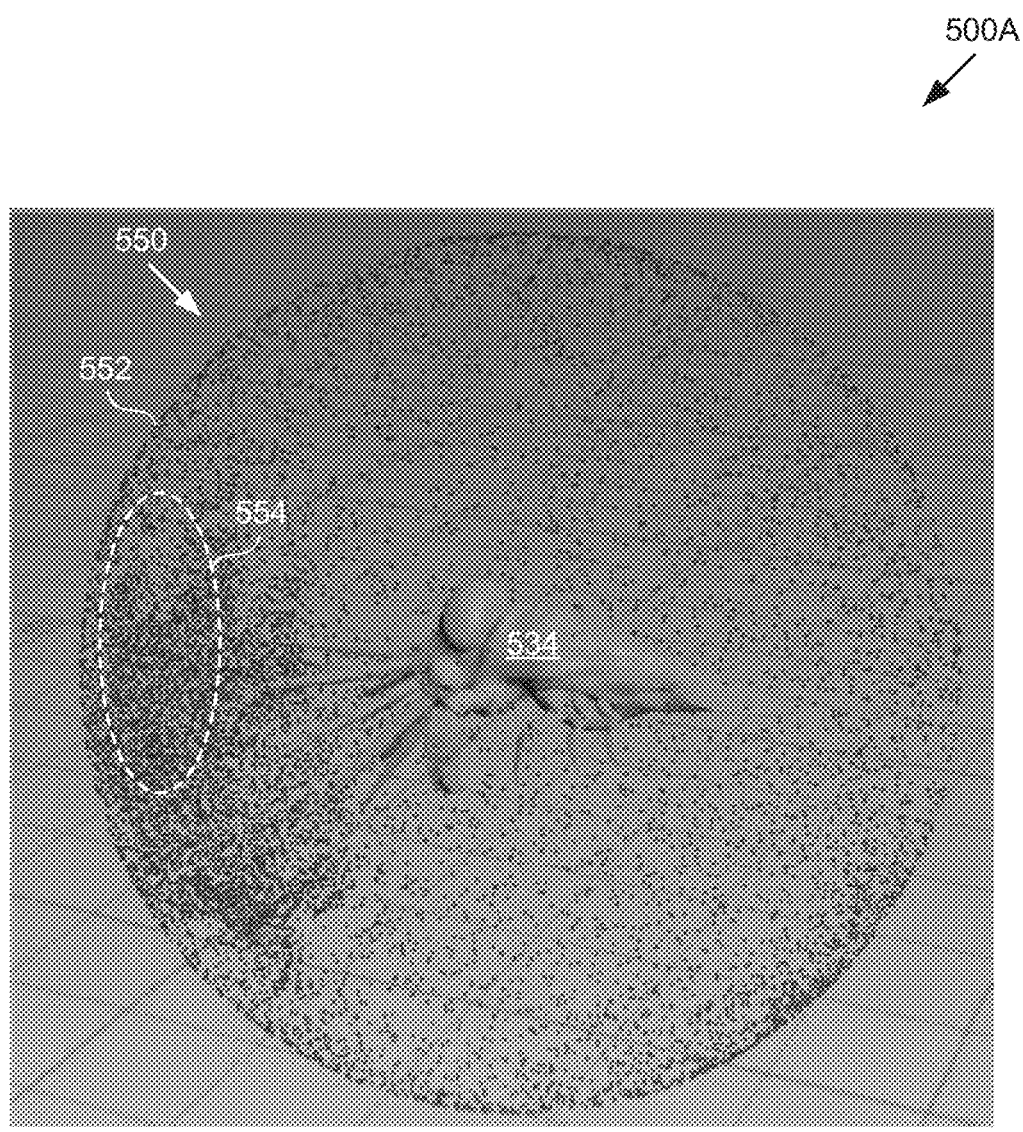
FIG. 5A depicts an intermediate action in the flowchart shown in FIG. 4, according to one implementation.

As shown in FIG. 4, in some implementations, action 220 may include generating a sphere surrounding digital object 134/334, the sphere having a radius such that any of virtual cameras 340a and 340b sharing the same focal length and located on the sphere would view a boundary of digital object 134/334 from the perspective of that virtual camera (action 421). Alternatively, virtual cameras 340a and 340b may be placed on any one or more closed surfaces having shapes that are not limited to spheres. It is noted that in those alternative implementations, virtual cameras 340a and 340b may have a variety of respective focal lengths based on their respective distances from digital object 134/334. As noted above, digital object 134/334 may be a high complexity 3D model of a human being, character, animal, or inanimate object. As shown in FIG. 5A, for example, in some use cases digital object 534 may take the form of a 3D mollusk, such as a squid for example.

It is noted that digital object 534 corresponds in general to digital object 134/334, in FIGS. 1 and 3A, and those corresponding features may share the characteristics attributed to any of those feature by the present disclosure. Like digital object 134/334, digital object 534 may be represented by a triangle mesh, or other polygonal mesh, having a polygon count in the millions, or tens of millions. Also shown in FIG. 5A are sphere 550 surrounding digital object 534, surface 552 of sphere 550, and intersections (shown as dark spots on sphere 550) corresponding to points at which occlusion rays cast from points on the surface of digital object 534 intersect surface 552 of sphere 550. In addition, FIG. 5A shows that the intersections at surface 552 of sphere 550 may have a variable surface density, represented by exemplary surface density 554, across surface 552 of sphere 550.

Figure 5B:
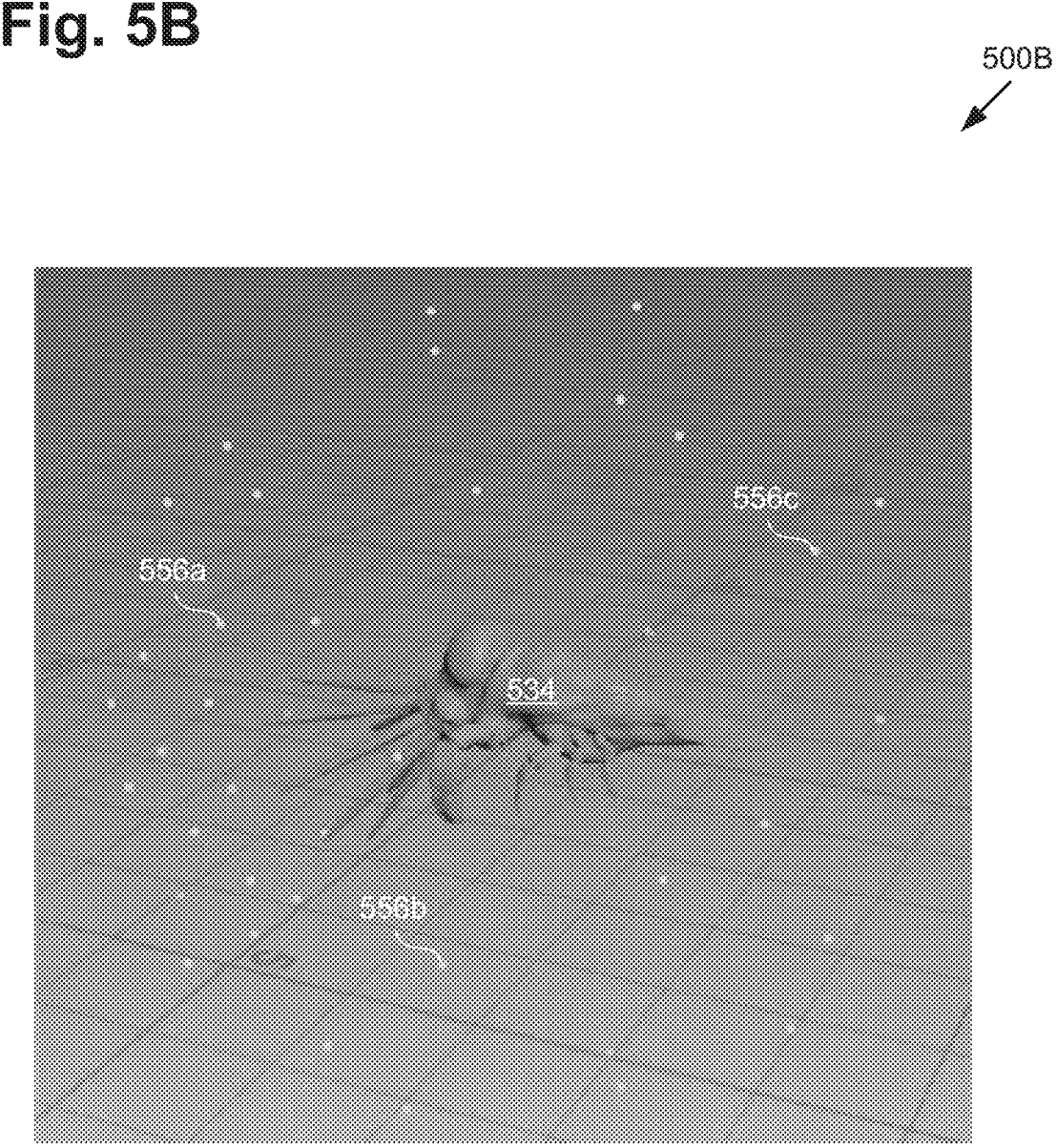
FIG. 5B depicts another intermediate action in the flowchart shown in FIG. 4, according to one implementation.
Figure 5C:
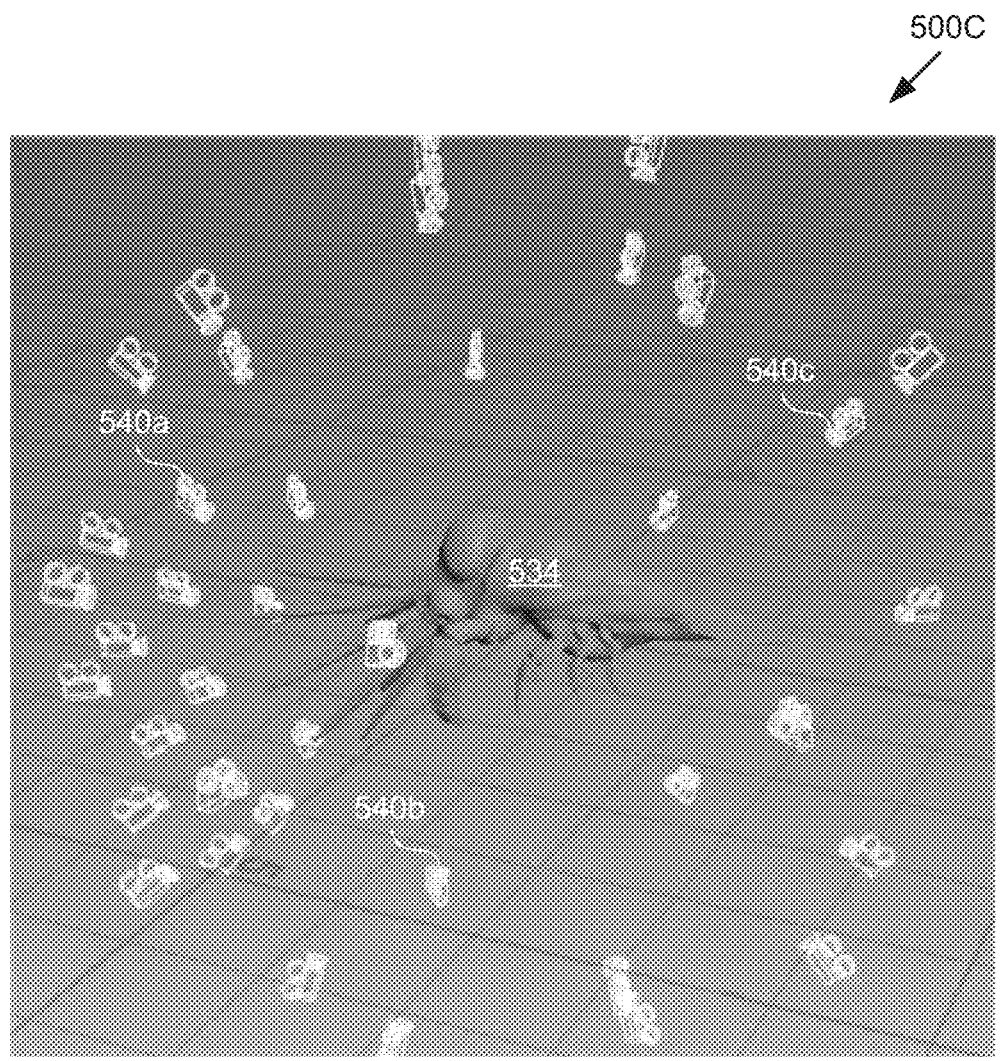
FIG. 5C depicts yet another intermediate action in the flowchart shown in FIG. 4, according to one implementation.

It is emphasized that although the exemplary implementation described by reference to flowchart 420 and FIG. 5A, as well as FIGS. 5B and 5C, refer to digital object 534 being surrounded by sphere 550, more generally sphere 550 may correspond to any one or more closed surfaces, some or all of which may assume different shapes. Moreover, the intersections described by reference to surface 552 of sphere 550 are representative more generally of the points at which the occlusion rays cast from the surface of digital object 534 intersect each surface of the one or more closed surfaces surrounding digital object 534.

Continuing to refer to the exemplary implementation in which one or more closed surfaces 550 takes the form of sphere 550, action 220 may further include casting multiple occlusion rays from each of multiple points on the surface of digital object 434 toward surface 552 of sphere 550, resulting in multiple intersections (action 422). The number of points from which occlusion rays are cast in action 422 may include substantially all points on the surface of digital object 434, or a subset of those points, which may be a predetermined subset, for example. The number of occlusion rays cast from a particular point on the surface of digital object 534 in action 422 may depend upon an identified ambient occlusion value for that point, where such an ambient occlusion value corresponds to how visible the particular point on the surface of digital object 534 is from surface 552 of sphere 550. One example of how an ambient occlusion value may be identified for a particular point is as follows: a test set of occlusion rays are cast spherically outward from the point, and the percentage of those occlusion rays that result in intersections determines the occlusion value of the point. Thus, a point for which ten percent of the occlusion rays emanating from it result in intersections may be identified as having a normalized occlusion value of 0.1, while a point for which twenty-five percent of occlusion rays emanating from it result in intersections may be identified as having a normalized occlusion value of 0.25, and so forth. Points on the surface of digital object 534 having lower ambient occlusion values, i.e., fewer of the rays cast from that point form intersections, may have more correspondingly more occlusion rays cast therefrom in action 422.

Continuing to refer to the exemplary implementation in which one or more closed surfaces 550 takes the form of sphere 550, action 220 may further include clustering the intersections, based on the number of virtual cameras for surrounding digital object 534 and surface density 554 of the intersections on surface 552 of sphere 550, to identify a respective camera location for each virtual camera (action 423). Referring to FIG. 5B, FIG. 5B shows multiple camera locations including exemplary camera locations 556a, 556b, and 556c identified based on clustering of the intersection shown in FIG. 5A. For example, a k-means clustering algorithm, as known in the art, may be applied to cluster the intersected points down to the number of requested virtual cameras. These new cluster points are used as the nodal positions of the virtual cameras. By clustering in this way, the hardest to see portions of digital object 534 are captured first, thereby advantageously minimizing the number of virtual cameras needed to cover the entire surface of digital object 534.

Action 220 may further include generating the virtual cameras at the respective camera locations identified in action 423 (action 424). Referring to FIG. 5C, FIG. 5C shows the virtual cameras generated so as to surround digital object 534. As shown in FIG. 5C, the virtual cameras generated in action 424 include exemplary virtual cameras 540a, 540b, and 540c (hereinafter "virtual cameras 540a-540c"), positioned at respective camera locations 556a, 556b, and 556c, in FIG. 5B. Virtual cameras 540a-540c correspond in general to virtual cameras 340a and 340b in FIGS. 3A and 3B. As a result, virtual cameras 540a-540c may share any of the characteristics attributed to virtual cameras 340a and 340b by the present disclosure, and vice versa. Thus, like virtual cameras 340a and 340b, virtual cameras 540a-540c may be implemented using a variety of different camera configurations and lens parameters. For example in one implementation, virtual cameras 540a-540c may take the form of panoramic cameras.

Action 220 may further include adjusting a lens parameter of at least one of the virtual cameras including virtual cameras 540a-540c based on a two-dimensional bounding box of digital object 534 from the perspective of the at least one of the plurality of virtual cameras (action 425). In one implementation, for example, each virtual camera may be oriented by rotating it to look at the center of digital object 534. The orientation may then be further refined to point at the center of the 2D bounding box of the digital object 534 from that particular perspective. The focal length may be adjusted such that the frustum of the virtual camera is tight to this same 2D bounding box, with a small percentage margin safe area on all sides.

With respect to the actions outlined by flowcharts 200 and 420, it is emphasized that actions 210, 220 including actions 421-424, 230, 240, 250, and 270, or actions 210, 220 including actions 421-424, 230, 240, 250, 260, and 270, or actions 210, 220 including actions 421-424, 230, 240, 250, and 280, or actions 210, 220 including actions 421-424, 230, 240, 250, 280, and 270, or actions 210, 220 including actions 421-424, 230, 240, 250, 260, 270, and 280, or actions 210, 220 including actions 421-424, 230, 240, 250, 260, 280, and 280, or actions 210, 220 including actions 421-425, 230, 240, 250, and 270, or actions 210, 220 including actions 421-425, 230, 240, 250, 260, and 270, or actions 210, 220 including actions 421-425, 230, 240, 250, and 280, or actions 210, 220 including actions 421-425, 230, 240, 250, 280, and 270, or actions 210, 220 including actions 421-425, 230, 240, 250, 260, 270, and 280, or actions 210, 220 including actions 421-425, 230, 240, 250, 260, 280, and 280 may be performed in an automated process from which human involvement may be omitted.

Thus, the present application discloses systems and methods for performing volumetric representation of digital objects from depth renderings that overcome the drawbacks and deficiencies in the conventional art. As noted above, the solution disclosed in the present application uses an image-based depth reconstruction approach to generate a digital representation of a high complexity digital object that can advantageously be used in real-time applications such as in game engines. The present solution relies on flat 2D renders of the original digital object only, and does not require the 3D mesh information of the original digital object. A reduced complexity volumetric representation of the highly complex original digital object is reconstructed from 2D images.

In contrast to conventional approaches that typically involve working with the original 3D mesh directly, often breaking it apart and selectively remodeling individual parts of it, the present solution advantageously works with the entire digital object at once and in a substantially automated way, while also natively incorporating any render-time details relevant to the description of the digital object, such as the application of displacement maps and procedural geometries. An additional advantage of the present solution over the conventional art is that the present approach represents only the external, outer features of the digital object, resulting in simplification due to the purposeful omission of internal features that do not need to be represented. Yet another advantage of the present solution is that the present approach relies on 2D images or renders of a 3D digital object to produce a reduced complexity representation of that digital object, rather than on the data describing the original 3D model of the digital object.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image processing system comprising:
   a computing platform including a processing hardware, a display, and a system memory storing a software code;
   the processing hardware configured to execute the software code to:
   surround a digital object with a plurality of virtual cameras oriented toward the digital object, the digital object being a three-dimensional (3D) digital object, wherein the plurality of virtual cameras is a predetermined plurality, and wherein surrounding the digital object with the plurality of virtual cameras includes:
      generating at least one closed surface surrounding the digital object;
      casting a plurality of occlusion rays from each of a plurality of points on a surface of the digital object toward a surface of the at least one closed surface, resulting in a plurality of intersections;
      clustering the plurality of intersections, based on the plurality of virtual cameras and a surface density of the plurality of intersections on the at least one closed surface, to identify a plurality of camera locations each corresponding respectively to one of the plurality of virtual cameras; and
   generating the plurality of virtual cameras at the plurality of camera locations;
   render, using each of the plurality of virtual cameras, a depth map identifying a distance of each of the plurality of virtual cameras from the digital object;
   generate, using the depth map, a volumetric perspective of the digital object from a perspective of each of the plurality of virtual cameras, resulting in a corresponding plurality of volumetric perspectives of the digital object;
   merge the plurality of volumetric perspectives of the digital object to form a volumetric representation of the digital object; and
   convert the volumetric representation of the digital object to a renderable form.

2. The image processing system of claim 1, wherein the volumetric representation of the digital object includes only externally visible details of the digital object.

3. The image processing system of claim 1, wherein to merge the plurality of volumetric perspectives of the digital object, the processing hardware is further configured to execute the software code to:
   determine a signed distance function (SDF) representation of each of the plurality of volumetric perspectives of the digital object, resulting in a corresponding plurality of SDF representations; and
   combine, using a Boolean intersection operation, the plurality of SDF representations to form the volumetric representation of the digital object.

4. The image processing system of claim 1, wherein the volumetric representation of the digital object includes a first region having a first voxel size and a second region having a second voxel size different than the first voxel size.

5. The image processing system of claim 1, wherein the processing hardware is further configured to execute the software code to:
   decimate the volumetric representation of the digital object to produce a down-sampled volumetric representation of the digital object;
   wherein the down-sampled volumetric representation of the digital object includes a first region and a second region, and wherein the first region is less decimated than the second region.

6. The image processing system of claim 1, wherein a field of view of the perspective of each of the plurality of virtual cameras includes a plurality of pixels of the digital object, wherein the depth map identifies a distance of each of the plurality of virtual cameras from each of the plurality of pixels, and wherein the processing hardware is further configured to execute the software code to:
   perform a deep rendering for at least some of the plurality of pixels, such that the depth map identifies a plurality of depth values corresponding to the distance of each of the plurality of virtual cameras from each of the at least some of the plurality of pixels.

7. The image processing system of claim 1, wherein the processing hardware is further configured to execute the software code to:
   adjust a lens parameter of at least one of the plurality of virtual cameras based on a two-dimensional bounding box of the digital object from the perspective of the at least one of the plurality of virtual cameras.

8. The image processing system of claim 1, wherein the digital object is represented by a first mesh representation having a first mesh element count, and wherein the renderable form is represented by a second mesh representation having a second mesh element count less than the first mesh element count.

9. The image processing system of claim 8, wherein the second mesh element count is at least ten times less than the first mesh element count.

10. A method for use by an image processing system including a computing platform having a processing hardware, a display, and a system memory storing a software code, the method comprising:
  surrounding, by the software code executed by the processing hardware, a digital object with a plurality of virtual cameras oriented toward the digital object, the digital object being a three-dimensional (3D) digital object, wherein the plurality of virtual cameras is a predetermined plurality, and wherein surrounding the digital object with the plurality of virtual cameras includes:
    generating at least one closed surface surrounding the digital object;
    casting a plurality of occlusion rays from each of a plurality of points on a surface of the digital object toward the at least one closed surface, resulting in a plurality of intersections;
    clustering the plurality of intersections, based on the plurality of virtual cameras and a surface density of the plurality of intersections on the at least one closed surface, to identify a plurality of camera locations each corresponding respectively to one of the plurality of virtual cameras; and
    generating the plurality of virtual cameras at the plurality of camera locations;
  rendering, by the software code executed by the processing hardware and using each of the plurality of virtual cameras, a depth map identifying a distance of each of the plurality of virtual cameras from the digital object;
  generating, by the software code executed by the processing hardware and using the depth map, a volumetric perspective of the digital object from a perspective of each of the plurality of virtual cameras, resulting in a plurality of volumetric perspectives of the digital object;
  merging, by the software code executed by the processing hardware, the corresponding plurality of volumetric perspectives of the digital object to form a volumetric representation of the digital object; and
  converting, by the software code executed by the processing hardware, the volumetric representation of the digital object to a renderable form.

11. The method of claim 10, wherein the volumetric representation of the digital object includes only externally visible details of the digital object.

12. The method of claim 10, wherein merging the plurality of volumetric perspectives of the digital object further comprises:
  determining, by the software code executed by the processing hardware, a signed distance function (SDF) representation of each of the plurality of volumetric perspectives of the digital object, resulting in a corresponding plurality of SDF representations; and
  combining, by the software code executed by the processing hardware and using a Boolean intersection operation, the plurality of SDF representations to form the volumetric representation of the digital object.

13. The method of claim 10, wherein the volumetric representation of the digital object includes a first region having a first voxel size and a second region having a second voxel size different than the first voxel size.

14. The method of claim 10, further comprising:
  decimating, by the software code executed by the processing hardware, the volumetric representation of the digital object to produce a down-sampled volumetric representation of the digital object;
  wherein the down-sampled volumetric representation of the digital object includes a first region and a second region, and wherein the first region is less decimated than the second region.

15. The method of claim 10, wherein a field of view of the perspective of each of the plurality of virtual cameras includes a plurality of pixels of the digital object, and wherein the depth map identifies a distance of each of the plurality of virtual cameras from each of the plurality of pixels, the method further comprising:
  performing a deep rendering, by the software code executed by the processing hardware, for at least some of the plurality of pixels, such that the depth map identifies a plurality of depth values corresponding to the distance of each of the plurality of virtual cameras from each of the at least some of the plurality of pixels.

16. The method of claim 10, further comprising:
  adjusting, by the software code executed by the processing hardware, a lens parameter of at least one of the plurality of virtual cameras, wherein the adjusting is based on a two-dimensional bounding box of the digital object from the perspective of the at least one of the plurality of virtual cameras.

17. The method claim 10, wherein the digital object is represented by a first mesh representation having a first mesh element count, and wherein the renderable form is represented by a second mesh representation having a second mesh element count less than the first mesh element count.

18. The method of claim 17, wherein the second mesh element count is at least ten times less than the first mesh element count.

* * * * *